(12) United States Patent
Ulrich et al.

(10) Patent No.: US 7,490,842 B1
(45) Date of Patent: Feb. 17, 2009

(54) FOLDING BICYCLE

(75) Inventors: Karl T. Ulrich, Narberth, PA (US); Nathan T. Ulrich, Lee, NH (US)

(73) Assignee: Xootr LLC ( * ) Notice: Subject to any disclaimer, the term of this patent is extended or adjusted under 35 U.S.C. 154(b) by 327 days.

(21) Appl. No.: 11/379,068

(22) Filed: Apr. 18, 2006

Related U.S. Application Data

(60) Provisional application No. 60/672,408, filed on Apr. 18, 2005.

(51) Int. Cl.
*B62K 19/02* (2006.01)
(52) U.S. Cl. ............... 280/278; 280/287; 280/639; 280/40
(58) Field of Classification Search .......... 280/287, 280/278, 639, 40
See application file for complete search history.

(56) References Cited

U.S. PATENT DOCUMENTS

| | | | | |
|---|---|---|---|---|
| 4,582,335 A * | 4/1986 | Paioli et al. | ............... | 280/278 |
| 5,052,706 A * | 10/1991 | Tsai et al. | ............... | 280/287 |
| 2004/0007851 A1* | 1/2004 | Chao | ............... | 280/287 |
| 2005/0062256 A1* | 3/2005 | Chen | ............... | 280/287 |
| 2005/0161898 A1* | 7/2005 | Chao | ............... | 280/278 |
| 2007/0024023 A1* | 2/2007 | Hsu | ............... | 280/287 |
| 2007/0029753 A1* | 2/2007 | Ritchey | ............... | 280/278 |
| 2007/0057482 A1* | 3/2007 | Hsu | ............... | 280/278 |

* cited by examiner

*Primary Examiner*—Paul N Dickson
*Assistant Examiner*—Marlon A Arce

(57) ABSTRACT

This invention relates to personal transportation devices and more specifically to folding bicycles. The invention consists of a folding frame comprised of a main tube with tuned cross section, a folding pivot axis perpendicular to the vehicle axis, and a locking mechanism further comprising a seat post rigidly retained by two clamping sections of a seat tube. The invention also consists of a rear wheel retention element—a "dropout"—with horizontal axle slots and a replaceable derailleur hanger.

1 Claim, 3 Drawing Sheets

Overall perspective view of an embodiment of the invention.

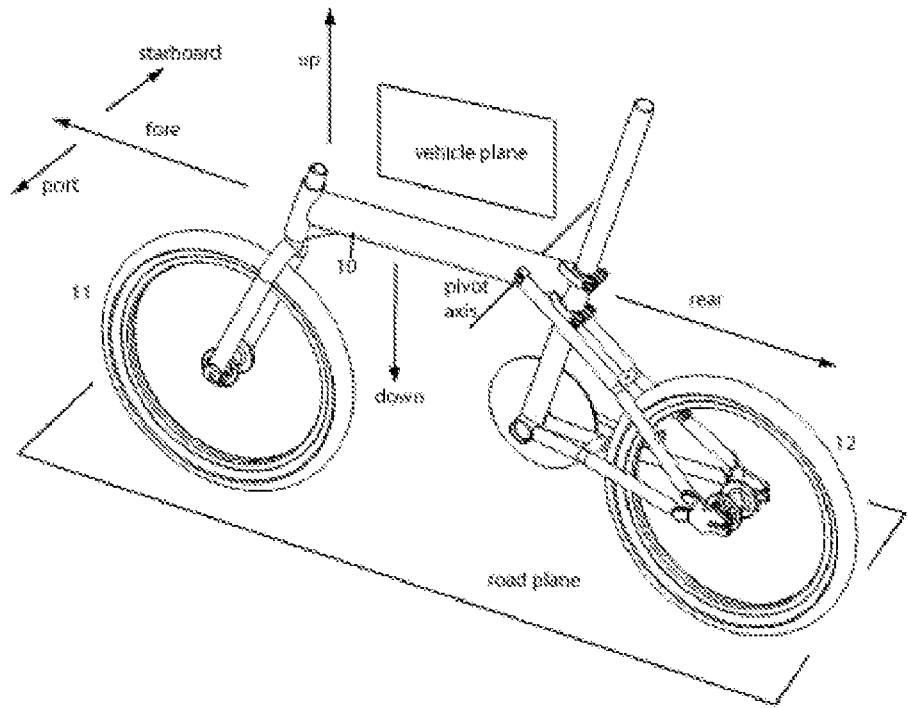
FIGURE 1. Overall perspective view of an embodiment of the invention.
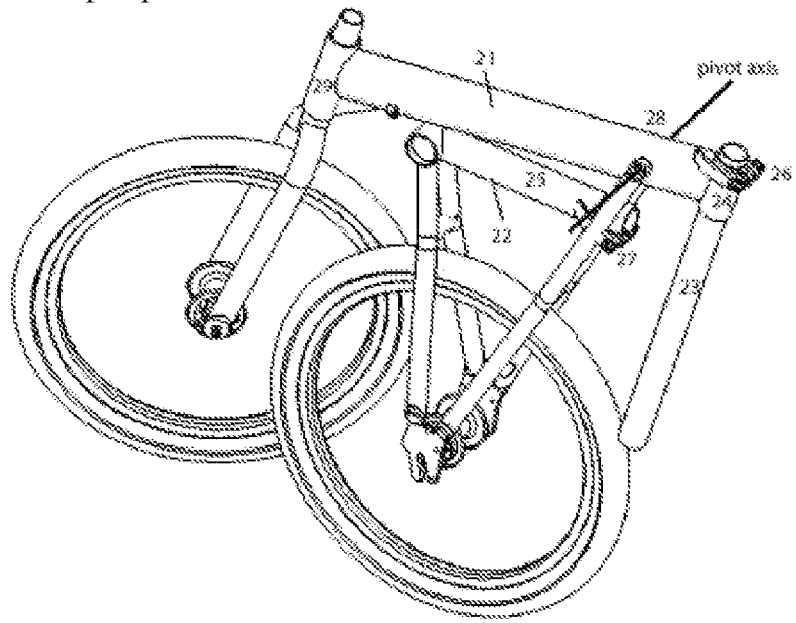
FIGURE 2. Perspective view of an embodiment of the invention shown in the folded configuration.

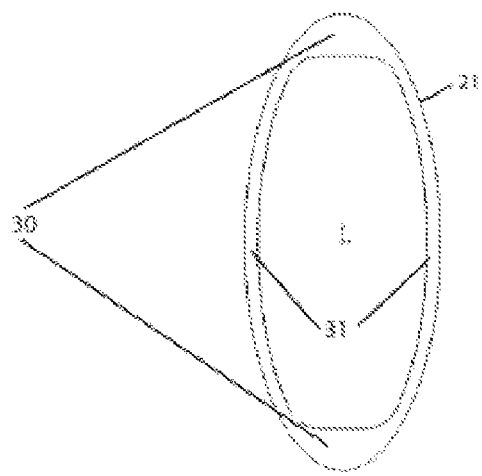
FIGURE 3. Cross sectional view of the main tube of an embodiment of the invention.
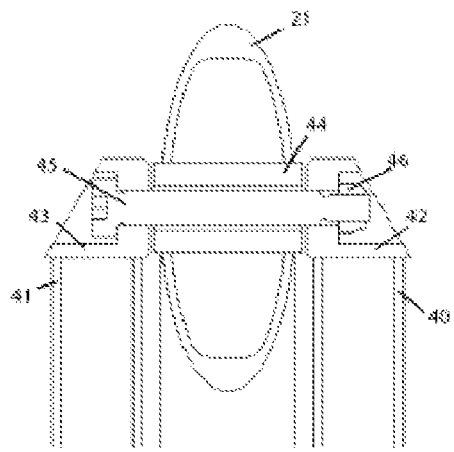
FIGURE 4. Cross sectional view of the pivot region of an embodiment of the invention.
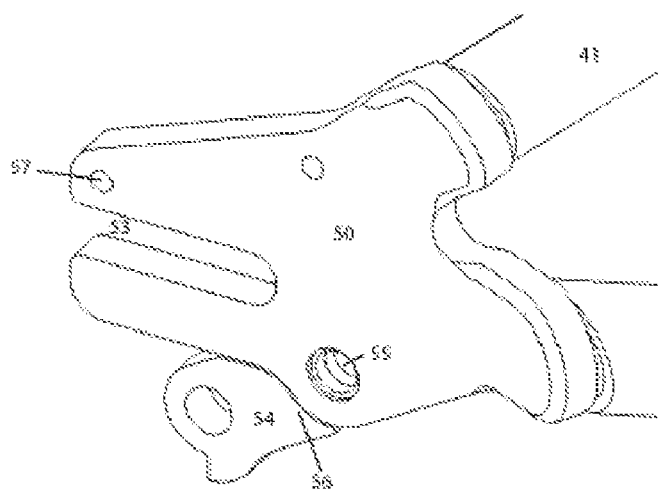
FIGURE 5. Perspective view of the rear dropouts of an embodiment of the invention with a derailleur hanger.

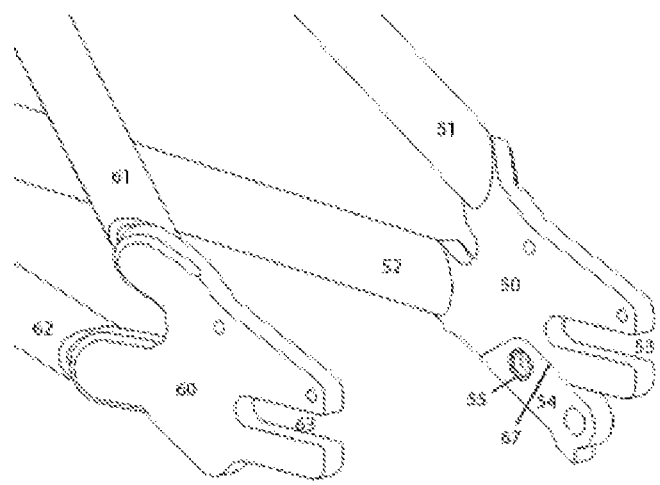
FIGURE 6. Perspective view, from the inside of the frame, of the rear dropouts of an embodiment of the invention with a derailleur hanger.
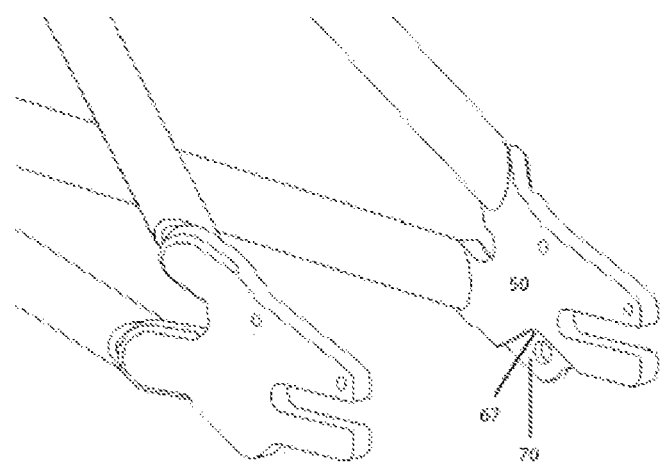
FIGURE 7. Perspective view of the rear dropouts of an embodiment of the invention without a derailleur hanger.

FOLDING BICYCLE

BACKGROUND

This invention relates to personal transportation devices and more specifically to folding bicycles.

Many attempts have been made to create folding bicycles and many products are available commercially on the market. A key problem with existing devices is that frame structures which accommodate folding typically are less rigid in the deployed configuration than those of a conventional bicycle. As a result, folding bicycles typically feel more flexible and less stable than conventional bicycles when ridden vigorously.

A second problem with folding bicycles is that they are often equipped with idiosyncratic transmission components, such as unusually small rear sprockets or special-purpose hubs. These components present barriers to servicing the bicycle and to adaptation of a folding bicycle frame to different applications.

It is the object of this invention to provide a bicycle whose frame delivers the essential performance characteristics of a full-sized bicycle frame, and yet is foldable. A further object of the invention is to provide a single frame that can be configured with a wide variety of different standard transmission elements.

SUMMARY

The invention consists of a folding frame comprised of a main tube with tuned cross section, a folding pivot axis perpendicular to the vehicle axis, and a locking mechanism further comprising a seat post rigidly retained by two clamping sections of a seat tube. The invention also consists of a rear wheel retention element—a "dropout"—with horizontal axle slots and a replaceable derailleur hanger.

BRIEF DESCRIPTION OF THE DRAWINGS

These and other features, aspects, and advantages of the present invention will become better understood with regard to the following description, appended claims and accompanying drawings, where:

FIG. 1 is an overall perspective view of an embodiment of the invention in the deployed configuration.

FIG. 2 is a perspective view of an embodiment of the invention shown in the folded configuration.

FIG. 3 is a cross sectional view of the main tube of an embodiment of the invention.

FIG. 4 is a cross sectional view of the pivot region of the main tube of an embodiment of the invention.

FIG. 5 is perspective view of the rear dropouts of an embodiment of the invention shown with a derailleur hanger.

FIG. 6 is a perspective view, from the inside of the frame, of the rear dropouts of an embodiment of the invention shown with a derailleur hanger.

FIG. 7 is a perspective view of the rear dropouts of an embodiment of the invention shown without a derailleur hanger.

DETAILED DESCRIPTION

A preferred embodiment of the invention is shown in FIG. 1. This embodiment is shown in the deployed position. A frame 10 connects a front wheel 11 and a rear wheel 12. For clarity, the bicycle is shown without seat, handlebars, pedals, and several other components not unique to the invention. For the purposes of this description and associated claims, we adopt the following definitions as indicated in FIG. 1. The road plane is a horizontal plane on which the bicycle is ridden. The vehicle plane is a vertical plane, perpendicular to the road plane and perpendicular to the axes of rotation of the wheels of the bicycle. The fore direction is defined as the direction towards the front wheel 11. The rear direction is defined as the direction towards the rear wheel 12. The starboard side of the vehicle is to the right when facing in the fore direction. The port side of the vehicle is to the left when facing in the fore direction. Up and the upward direction are normal to the road plane as shown in FIG. 1. Down and the downward direction are defined as the direction normal to the road plane as shown in FIG. 1. A pivot axis is perpendicular to the vehicle plane and intersects the frame as shown.

FIG. 2 shows a preferred embodiment of the invention in the folded position. A main tube 21 connects a steering pivot 29 and an upper seat tube 24. An upper seat tube clamp 26 acts on the upper seat tube 24 to releasably retain seat post 23. A rear frame structure 22 pivots about the pivot axis intersecting the main tube 21 at pivot 28. The rear frame structure comprises a lower seat tube 25, which further comprises a lower seat tube clamp 27. Seat post 23 mates axially with the upper seat tube 24, and with both the upper seat tube 24 and lower seat tube 25 when the bicycle is in the deployed position. When in the deployed position, and when both upper seat tube clamp 26 and lower seat tube clamp 27 are in the clamped position, seat post 23 is rigidly retained relative to upper seat tube 24 and lower seat tube 25. The stiffness of the seat post 23 and the clamping forces retain the deployed frame in a highly rigid configuration, forming a truss-like structure comprising the main tube 21, seat post 23, and rear frame structure 22.

FIG. 3 is a cross sectional view of main tube 21. The tube is hollow with a wall thickness that varies around the perimeter of the section. The tube is axially symmetric and can be manufactured by extrusion. In a preferred embodiment of the invention the tube is extruded from 6000-series aluminum alloy, which is readily extruded and provides for reasonably high strength at modest cost. In order to provide the main tube with high stiffness, relative to bending in the vehicle plane, without excessive weight, the wall thickness of the main tube is substantially thicker in the upward and downward regions 30 than in the port and starboard regions 31. In a preferred embodiment, the tube is 6061 T6 aluminum and the moment of inertia for bending in the vehicle plane is at least 200,000 $mm^4$, resulting from an overall section depth of approximately 70 mm, a section width of approximately 30 mm, a wall thickness in regions 31 of approximately 2.0 mm and a wall thickness in regions 30 of approximately 6.5 mm.

FIG. 4 shows the pivot 28 in cross section. Main tube 21 includes sleeve 44. In a preferred embodiment, sleeve 44 is welded to main tube 21. Seat stay 40 and seat stay 41 are attached to pivot bosses 42 and 43. A shoulder bolt 45 and nut 46 connect pivot bosses 42 and 43 to sleeve 44, and shoulder bolt 45 acts as the pivot pin for pivot 28. In a preferred embodiment pivot bosses 42 and 43 are welded to seat stays 40 and 41 respectively. The use of shoulder bolt 45 and nut 46 allows the pivot 28 to be disassembled and thus allows the separation of main tube 21 from rear frame structure 22. Such disassembly facilitates the transport of the frame in a suitcase or other small package.

FIG. 5 shows the starboard rear dropout 50 of the invention. The dropout includes a slot 53 for retaining a rear-wheel axle. The horizontal orientation of slot 53 allows a rear wheel to be adjusted in the forward or rearward position to properly tension the drive chain in a single-gear configuration or in an internal hub configuration. The use of a horizontal dropout thus makes the invention adaptable to a wide variety of transmission options.

Hole 57, which in a preferred embodiment is threaded for an M5 fastener, allows for a fastener to be attached to dropout 50. The head of a fastener, so positioned, prevents a rear wheel from sliding out the rear of the dropout by interfering with the axle nut, quick release lever, or axle skewer nut of the rear wheel, thus preventing rearward disengagement of the rear axle.

Derailleur hanger 54 is attached to dropout 50 by means of a fastener inserted through hole 55. The mating surfaces 56 of the derailleur hanger 54 and the dropout 50 in combination with a fastener through hole 55 prevent the relative motion of derailleur hanger 54 and dropout 50. This element of the invention allows the derailleur hanger 54 to be replaced if damaged, or to be removed altogether in the event that a transmission without derailleur is used on the bicycle. The position of hole 55 and mating surfaces 56 allow the derailleur hanger to be positioned correctly for proper gear shifting, while not interfering with the horizontal motion of a rear wheel axle in the slot 53.

FIG. 6 shows dropout 50 from the perspective of the port side of the bicycle. A second pair of mating surfaces 67 contribute to rigidly retaining the dropout 50 and the derailleur hanger 54. Port dropout 60 is shown with port axle slot 63.

FIG. 7 shows dropout 50, with no derailleur hanger attached, from the perspective of the port side of the bicycle. Pocket 70 is positioned on the inside of dropout 50 and is largely invisible from the outside of the bicycle when no derailleur hanger is present.

The combination of horizontal slot 53 and derailleur hanger 54 allow the invention to accommodate essentially any common bicycle transmission, whether derailleur, internal hub, fixed gear, or single-speed.

The foregoing discussion should be understood as illustrative and should not be considered to be limiting in any sense. While this invention has been particularly shown and described with reference to preferred embodiments thereof, it will be understood by those skilled in the art that various changes in form and details may be made therein without departing from the spirit and scope of the invention as defined by the claims.

We claim:

1. A bicycle comprising a frame, said frame further comprising
    a main tube,
    a rear frame structure,
    a seat post,
    an upper seat tube,
    a lower seat tube,
    and a pivot;
wherein said upper seat tube is fixedly connected to said main tube and wherein said lower seat tube is fixedly connected to said rear frame structure,
wherein when said bicycle is in the deployed position said lower seat tube and said upper seat tube are aligned axially with said seat post inserted through said lower seat tube and said upper seat tube,
wherein, when said seat post is removed from said lower seat tube, said pivot allows said main tube along with said fixedly connected upper seat tube to rotate relative to said rear frame structure and said fixedly connected lower seat tube,
wherein the axis of rotation of said pivot is perpendicular to the vehicle plane and intersects said main tube,
and wherein said main tube is characterized by a cross section whose major axis is substantially oriented in the upward-downward direction, and whose wall thickness in the upward and downward regions is substantially greater than in the port and starboard regions.

* * * * *